Aug. 18, 1942.  W. L. POLLARD  2,293,358
TURBO-PLANETARY TRANSMISSION
Filed Dec. 11, 1939  4 Sheets-Sheet 1
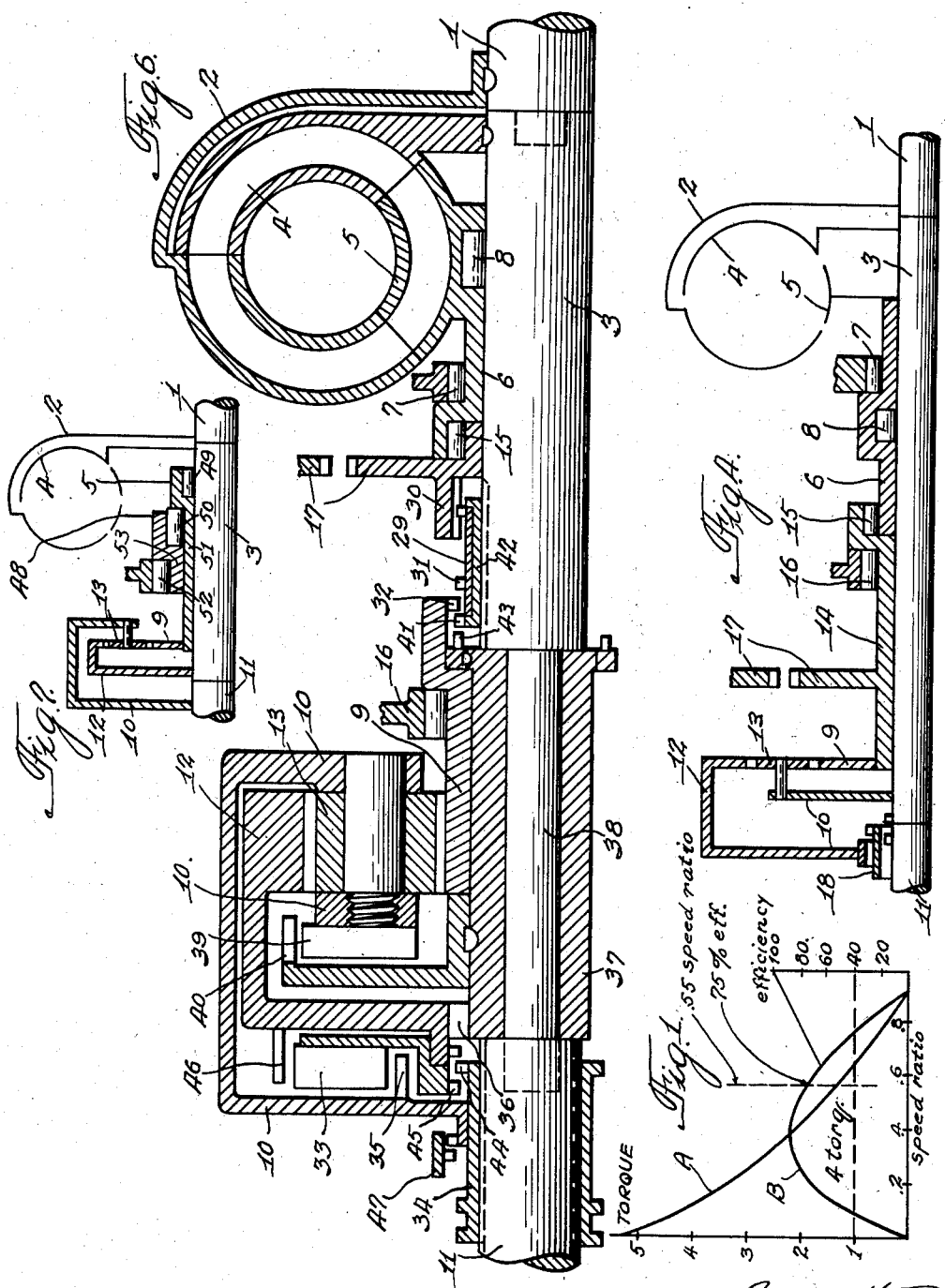

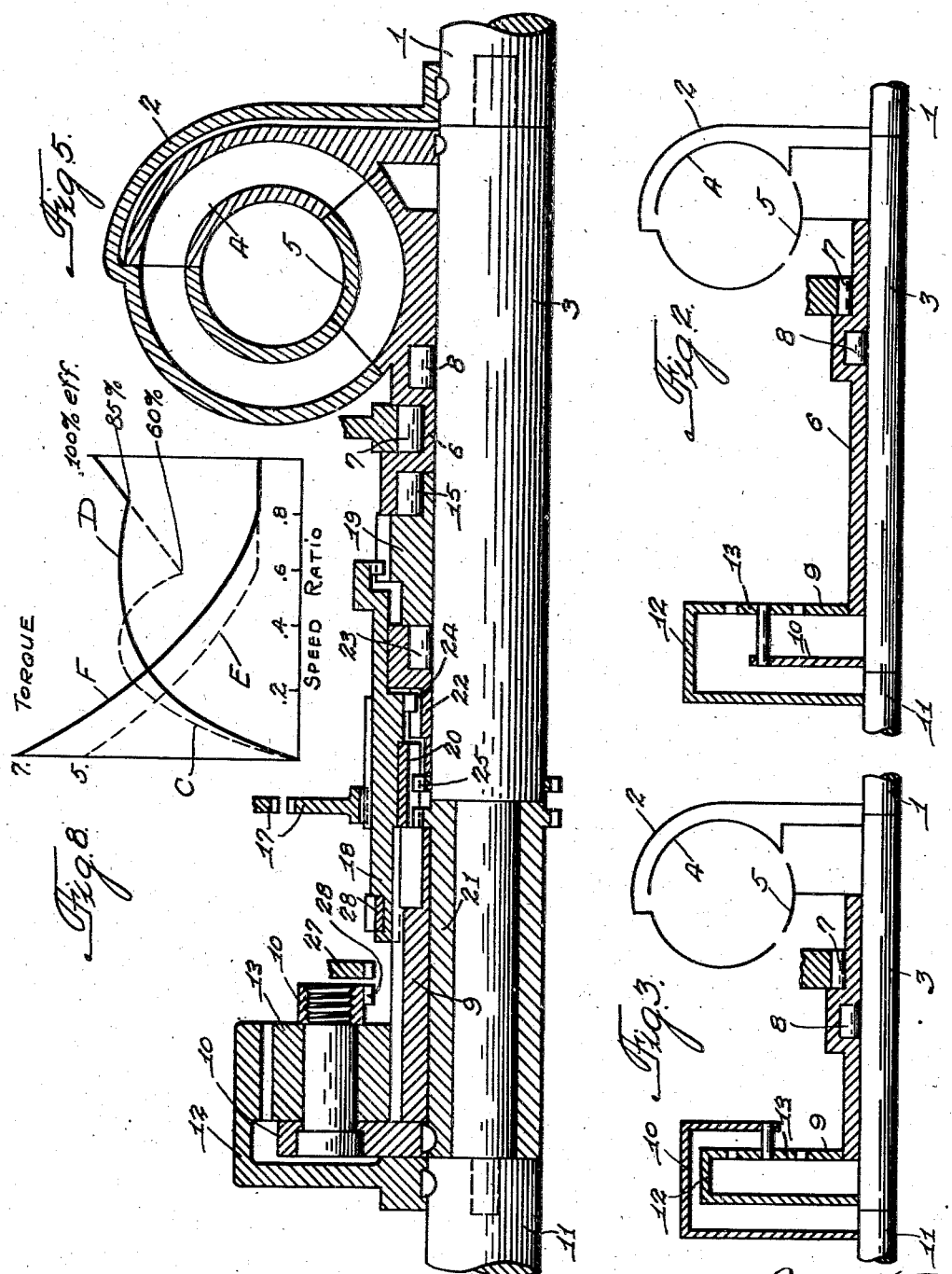

Aug. 18, 1942.   W. L. POLLARD   2,293,358
TURBO-PLANETARY TRANSMISSION
Filed Dec. 11, 1939   4 Sheets-Sheet 3
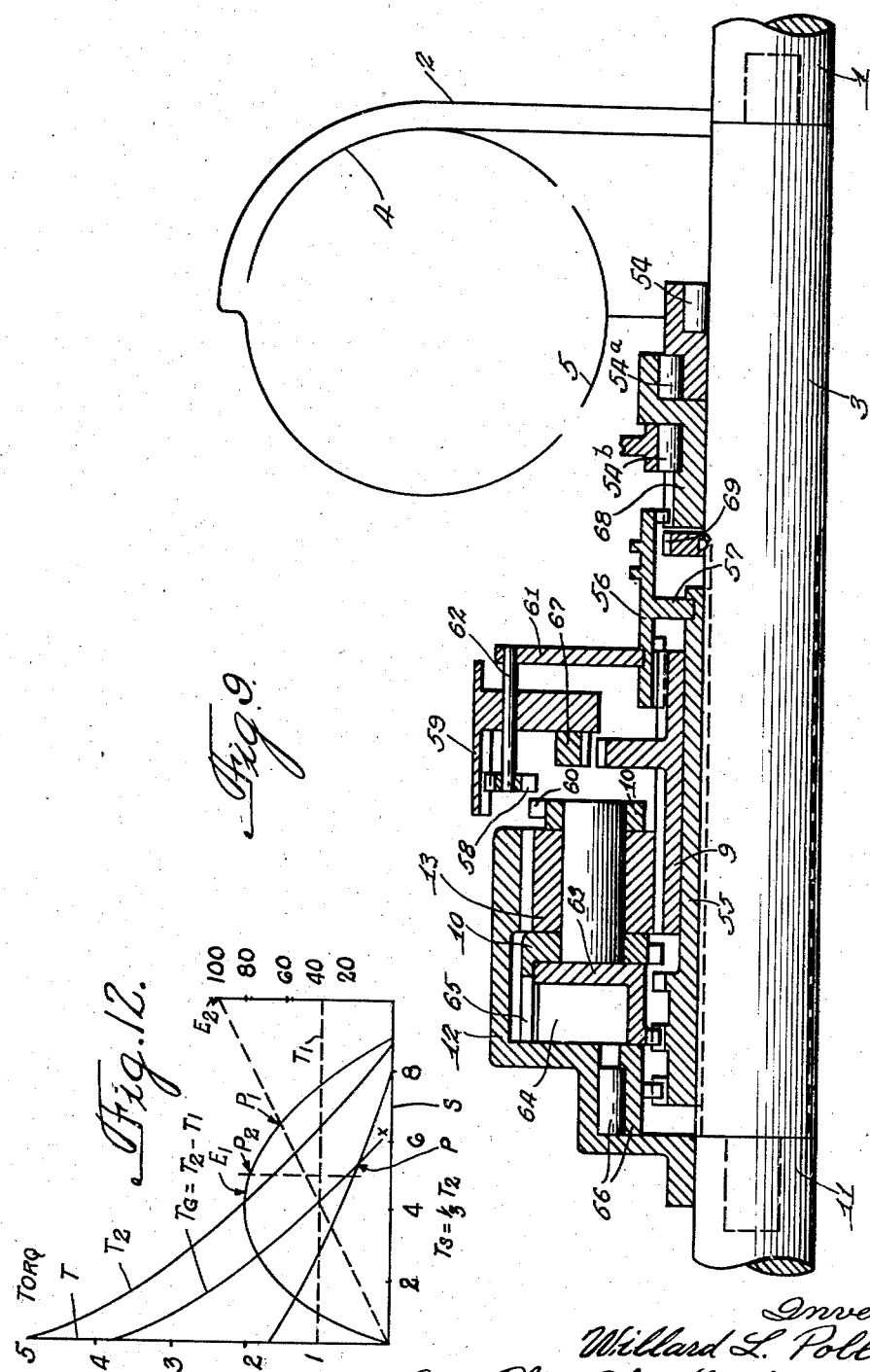

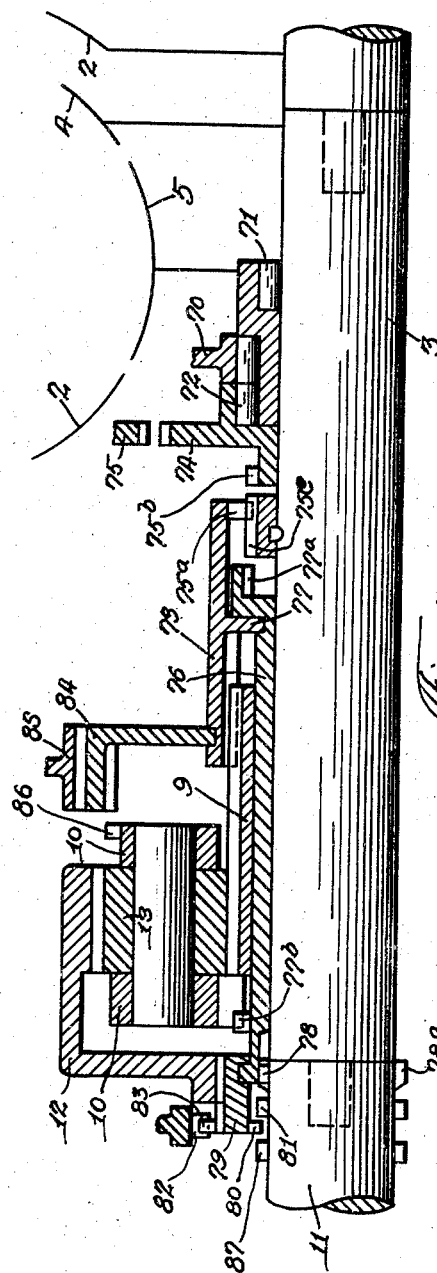

Patented Aug. 18, 1942

2,293,358

UNITED STATES PATENT OFFICE 2,293,358

TURBOPLANETARY TRANSMISSION

Willard L. Pollard, Evanston, Ill.

Application December 11, 1939, Serial No. 308,668

10 Claims. (Cl. 74—189.5)

My invention relates to turbo-planetary transmissions.

One of the objects of my invention is to provide a turbo-planetary transmission of the type in which the turbo drive automatically changes from torque converter to coupler and in which this automatic change may be made to take place under a condition in which the efficiency of the turbo mechanism as a torque converter is relatively high.

A further object is to provide such a construction in which the speed ratio of the final driven member with respect to the primary driving member will be relatively high at the point where the change takes place.

A further object is to provide such a construction in which a suitable overdrive may be obtained when desired.

A further object is to provide such a construction in which a suitable reverse drive may be obtained when desired.

A further object is to provide an improved turbo-planetary transmission in which the two different rotatable elements of a hydraulic torque converter are connected, respectively, to two different rotatable elements of the planetary mechanism.

Further objects and advantages of the invention will be apparent from the description and claims.

In the drawings, in which several forms of my invention are shown,

Figure 1 is a chart showing characteristics of a usual type of fluid torque converter;

Fig. 2 is a somewhat diagrammatic view showing one form of my invention;

Fig. 3 is a diagrammatic view showing another form;

Fig. 4 is a diagrammatic view showing another form;

Fig. 5 is an axial section showing another form;

Fig. 6 is an axial section showing another form;

Fig. 7 is a diagrammatic view showing another form;

Fig. 8 is a chart showing certain characteristic curves;

Fig. 9 is an axial sectional view showing another form;

Fig. 10 is an axial sectional view showing another form;

Fig. 11 is an axial sectional view showing another form; and

Fig. 12 is a chart showing certain characteristic curves.

Referring first to Fig. 2, the construction shown comprises a drive shaft 1 which may be the drive shaft of an internal combustion engine, a pump rotor 2 secured to rotate with this shaft, a second shaft 3 coaxial with the first shaft, a turbine rotor 4 secured to rotate with this shaft 3, a one-way turbo-stator 5, a tubular shaft 6, coaxial with the shaft 3, to which this turbo-stator is secured, a one-way holding device 7 for preventing reverse rotation of the stator, a one-way clutch 8 for preventing the tubular shaft 6 from running ahead of the shaft 3, a sun gear 9 secured to the tubular shaft 6, a planet carrier or cage 10 secured to the shaft 3, a driven shaft 11 which may be the propeller shaft of an automobile, a ring gear 12 mounted on this propeller shaft, and planet gears 13 mounted on the gear carrier 10 and meshing with the sun gear and ring gear.

Before describing in further detail the various forms, I will briefly outline the operation of the form just described. With the vehicle at rest, the motor shaft 1 is rotated in a clockwise direction, as viewed from the right-hand end of Fig. 2. This drives the pump rotor 2 in clockwise direction and, by means of the fluid, drives the turbine rotor 4 in a clockwise direction, the torque initially exerted on the turbine rotor being about five times that on the pump rotor. At the same time there is a torque exerted on the stator 5 equal to about four times that on the pump rotor and in a counterclockwise direction. This causes the sleeve 6, which is fixed to the stator 5, to be locked in position by means of the one-way anchorage 7. The drive is now as follows: from shaft 1, pump rotor 2, turbine rotor 4, shaft 3, planet carrier 10, planet wheel 13, ring gear 12, to propeller shaft 11. Since the sun gear 9 is fixed to sleeve 6, which is locked as noted above by the one-way anchorage 7, the drive causes the ring gear 12 to travel at a greater speed than the planet carrier 10 and hence at a greater speed than the turbine rotor 4 to which the planet carrier 10 is attached. Under this condition of operation the one-way clutch 8 permits the shaft 3 to overrun the sleeve 6 since the shaft 3 is running at a greater clockwise speed than the sleeve 6. As the speed of the turbine rotor 4 increases, the reactive force on the stator 5 decreases until the counterclockwise torque on the stator 5 becomes less than the clockwise torque on the sun gear 9. Thereafter the hydraulic part of the drive ceases to act as a torque converter and acts as a coupler. Let it be assumed that the characteristic curves of the hydraulic part of the transmission are those shown in Fig.

1, which shows the curves of a known type of hydraulic torque converter. In this chart, the curve A is the torque ratio curve of the turbine with respect to the pump plotted against the speed ratio of the turbine with respect to the pump. The curve B shows the efficiency between the turbine and pump plotted against the speed ratio of the turbine with respect to the pump. From an inspection of these curves it appears that the initial torque of the turbine is about five times that of the pump and that the torque of the turbine becomes equal to that of the pump at a speed ratio of about .6. It will also be seen that the efficiency curve B starts at zero and becomes about eighty per cent. when the speed ratio is about twenty-five per cent. and that the efficiency stays above eighty per cent. until the speed ratio reaches something over fifty per cent. It will be seen that the turbine torque curve decreases and becomes equal to the pump torque line at a speed ratio of about sixty per cent., at which speed ratio the efficiency is also about sixty per cent.

Let it be assumed that it is desired to combine with this fluid torque converter coupler a planetary transmission such that the transition from torque converter to coupler will take place at a speed ratio between the propeller shaft and motor shaft of seventy-five per cent. and also at an efficiency between pump torque and turbine torque of seventy-five per cent. With this in mind a point on the descending side of the efficiency curve is selected, at which the efficiency is seventy-five per cent. A point on the torque curve corresponding to this efficiency point is determined, this being found at a point where the torque ratio between the turbine and pump is about 1.4 per cent. A planetary gear is then designed so that when the sun gear is held stationary and the planet carrier is rotated, the speed of the ring gear with respect to the planet carrier will be 1.4; that is to say, the same as the number corresponding to the determined point of the torque ratio curve. Assume that such a planetary is designed and combined with the turbo mechanism as shown in Fig. 2. Assume that at first the propeller shaft is stationary and the motor shaft is driven at a definite speed carrying with it the pump rotor. At first the efficiency will be very low and the overall torque relatively high—about 3.5. As the propeller shaft picks up in speed, the efficiency curve of the hydraulic converter rises until it reaches about eighty-five per cent. and then falls. The torque curve continues to fall throughout the range. When the torque curve (which is the curve of turbine torque with respect to pump torque and represents the drag on the cage 10) has fallen to 1.4, the planet carrier torque will also have fallen to 1.4 as both are secured to the same shaft. At this point the ring gear torque will have fallen to equal that of the pump torque, since the gear carrier torque is always 1.4 times the ring torque. When the ring torque has fallen to this point, at which it equals the pump torque, the torques acting on the tubular shaft are equal and in opposite directions and the tubular shaft can begin to float. At this point, the entire overall transmission acts as a coupler with no torque conversion, the ring torque just equalling the pump torque. It will be seen that this transition from torque conversion to pure coupling has taken place at a point where the hydraulic efficiency is seventy-five per cent. and at a point where the over-all speed ratio between the propeller shaft and motor shaft is seventy-five per cent. This gives an improvement in the efficiency curve over that shown in Fig. 1 where the efficiency drops to sixty per cent. before the transition takes place. If the load on the propeller shaft continues to decrease, the sun gear will continue to increase in speed until it equals that of the turbine shaft, at which time the one-way clutch 8 will take hold and prevent the sun gear 9 from overrunning the turbine shaft 3.

In the construction shown in Fig. 3, the hydraulic part of the transmission, the one-way holding device 7, and the one-way clutch 8 are the same as that shown in Fig. 2. In this form, however, the ring gear 12 is connected to the turbine shaft 3 and the gear carrier 10 is connected with the propeller shaft 11. This gives a high initial torque and may be useful where high initial torque is important as compared to efficiency at higher speed ratios.

Fig. 12 shows graphically the point where the change from torque converter to coupling takes place. In Fig. 12 the vertical scale or coordinate T represents torque. The horizontal scale or coordinate S represents speed ratio of turbine to pump. The vertical scale $E^2$ represents efficiency. The straight line $T^1$ indicates the torque of the pump which is taken as constant. The curve $T^2$ represents torque of the turbine. The curve $E^1$ represents efficiency of the fluid torque converter for different values of S. The curve $Tg$ represents the reverse torque on the stator. Under the law of hydraulic torque converter $Tg = T^2 - T^1$. It will be assumed for the sake of simplicity that the diameter of the ring gear is twice the diameter of the sun gear. From an inspection of Fig. 2 it is evident that the torque on the cage 10 is equal to the torque on the turbine or, in other words, equals $T^2$. When the ring gear is equal to twice the diameter of the sun gear from the laws of planetary transmission, it follows that the torque on the sun gear due to the torque on the cage 10 is equal to one-third the torque on the cage. Since the torque on the cage equals the torque on the turbine, it follows that the torque on the sun gear equals one-third the torque on the turbine, or $Ts = 1/3 T^2$. The curve for $Ts$ is shown in Fig. 12. The point where $Tg$ intersects $Ts$, indicated at P, is the point of transition from torque converter to coupler. The point on the efficiency curve where this takes place is indicated at $P^2$ directly above P. The point where the transition from torque converter to coupler would take place, if the sun gear were not connected to the stator, is indicated at $P^1$. From this it appears that with the sun gear connected to release the stator, the change from converter to coupler takes place at a much higher point on the efficiency curve than when the sun gear is not connected to start the stator to rotating.

In the construction shown in Fig. 4, provision is made for an overdrive with hydraulic coupling and for an alternatively usable high torque arrangement. In this form the hydraulic converter and coupler may be the same as in Figs. 2 and 3. The sun gear 9 is mounted on a sleeve 14 which has a one-way clutch connection 15 with the sleeve 6 on which the one-way stator is mounted to prevent the sleeve 14 from overrunning the sleeve 6. A one-way holding device or anchor 16 is provided to prevent reverse rotation of the sun gear 9 to prevent excessive free wheeling. A latch or holding device 17 is provided by means of which the sun gear may be held against rotation when desired for overdrive. A clutch 18 is provided which may be controlled either manually or by a combination of speed and manual control, by means of which the propeller shaft 11 may be connected to rotate either with the ring gear 12 or with the turbine shaft 3. With this form, on the one hand, curves may be obtained like those of A and B of Fig. 1, or like those of D and F of Fig. 8 on the other hand.

In Fig. 5 is shown a construction by means of which reverse and overdrive may be obtained as well as two different forward speed ratios. In this form the parts 1–15, incl., and 17 may be the same as those previously described. This construction comprises also a three-position clutch control. In the right-hand position of the clutch controller 18, the sun gear 9 is connected with the stator 5 through the shiftable clutch sleeve 18 and the one-way clutch 15. This shiftable clutch sleeve 18 is splined to the sun gear and to the one-way clutch member 19. In this right-hand position, the cage 10 is connected with the turbine 4 through the coupling sleeve 20 and shaft 3. This coupling sleeve 20 is rotatably mounted in the sleeve 18 and has a splined connection with the sleeve 21 and shaft 3. In this position of parts, the operation is like that of the construction of Fig. 4 when the ring gear 12 of Fig. 4 is connected to the propeller shaft 11. It will be noted that in this position an overdrive can be obtained by holding the sun gear 9 against rotation by means of the latch mechanism 17.

In the intermediate position of the clutch member 18 the sun gear 9 is disconnected from the one-way clutch member 19 but is still connected with the sleeve 22 which forms part of the one-way clutch 23, which clutch prevents this sleeve 22 from overrunning the turbine shaft 3. The cage is still connected with the turbine 4 through the clutch sleeve 20. In this position of parts, the operation follows the curves C and E of Fig. 8, and an overdrive can be obtained by means of the latch 17.

In the left-hand position of the clutch sleeve, the sun gear 9 is connected to the turbine shaft 3 through the engagement of the dogs 24 on the sleeve 18 with the clutch ring 25 fast on the turbine shaft 3. The cage 10 is uncoupled from the shaft 3 by the disengagement of the clutch ring 20 from the clutch ring 25 on the shaft 3 and the cage is held against rotation by the engagement of the clutch ring 26 with the teeth on the stationary clutch ring 27 and the clutch ring 28 secured to the cage 10. The clutch ring 26 is swiveled on the sleeve 18 so that it can accommodate itself to the fixed clutch ring 27 and the rotatable clutch ring 28. In this position of parts, reverse is secured since the sun gear 9 is driven by the turbine 4 and the cage 10 is held against movement, thus causing reverse rotation of the ring gear 12.

In Fig. 6 the construction of the parts 1–17, incl., may be the same as that in the forms previously described. In this form, means are provided for obtaining reverse and four different forward speeds, including an overdrive. There are two positions of the clutch mechanism. In the left-hand position of the clutch sleeve 29 the sun gear 9 is connected to the one-way stator 5 through the clutch sleeve 29, one-way clutch 15, and sleeve 6. The clutch sleeve 29 is splined to the bearing sleeve member 30 of the one-way clutch 15 and connected with the sun gear by means of the dog teeth 31 on the sleeve engaging the dog teeth 32 on the sun gear. The cage 10 is connected to the propeller 11 through the centrifugal clutch 33 and the clutch sleeve 34 splined on the propeller shaft 11, which sleeve 34 is in left-hand position. The centrifugal clutch member 33 at low speeds is in latching engagement with a flange 35 on the cage and in clutching engagement through the dog teeth with the dog ring on the clutch sleeve. A one-way clutch 36 is provided between the ring gear 12 and the tubular shaft 37 mounted on an extension 38 of the turbine shaft 3. A centrifugal clutch 39 is provided between this sleeve 37 and the inner portion of the cage 10 so designed that at an intermediate speed ratio the centrifugally-controlled clutch dog 39 will fly out and engage in recesses in the clutch drum 40 secured to the sleeve 37.

With the clutch sleeves 29 and 34 in their left-hand position, in which the dog teeth 41 on the clutch sleeve 42 splined to the turbine shaft 3 engage the dog teeth 43 on the tubular shaft 37 and the dog teeth 31 on the clutch sleeve 29 engage the clutch teeth 32 on the sun gear 9 and the dog teeth 44 on the clutch sleeve 34 engage the dog teeth 45 on the centrifugal clutch 33, three forward speeds may be obtained depending upon the position of the centrifugal members 33 and 39. At low speeds the centrifugal clutch member 33 may be connected with the cage 10. At high speeds the centrifugal clutch member 33 will connect with the ring gear 12. At low speeds the centrifugal clutch member 39 will be out of engagement with the clutch drum 40. At a higher speed this centrifugal clutch member 39 will be in engagement with the clutch drum 40. The centrifugal clutch member 39 will engage the clutch member 40 at a lower speed than the centrifugal clutch member 33 will move out of engagement with the cage clutch ring 35 and into engagement with the ring gear clutch member 46. The one-way clutch 36 will cause the tubular shaft 37 to drive the ring gear 12 when the centrifugal clutch member 39 on the cage 10 is out of engagement with the clutch drum 40 keyed to the shaft 37.

Thus at low speeds of the propeller shaft the operation will be substantially like that of the construction shown in Fig. 3, the ring gear 12 being connected with the turbine shaft 3 through the one-way clutch 36, tubular shaft 37, clutch teeth 43 and 41 and clutch sleeve 42. The sun gear will be connected with the stator 5 as in Fig. 3 by means of the clutch sleeve 29 and the one-way clutch 15. At a higher speed the centrifugal clutch 39 may be caused to engage the clutch drum 40 whereupon the parts will operate as the construction of Fig. 4 operates when the propeller shaft 11 of Fig. 4 is coupled to the cage 10.

In Fig. 6 the cage 10 will be coupled to the turbine 4 as previously described and the propeller 11 will still be connected with the cage 10 through the centrifugal clutch 33 which has not yet been thrown into its outermost position. The ring 12 precesses with respect to the tubular sleeve 37 without affecting the other parts.

At a still higher speed the centrifugal clutch member 33 may be caused to disengage the cage drum 35 and engage the ring drum 46 to couple the propeller shaft 11 to the ring 12. With this arrangement of parts, the operation will be like that of Fig. 2. An overdrive may be obtained by operating the latch 17 to hold the sun gear against rotation. For reverse, the clutch members 29 and 34 are shifted to the right-hand position. In this position the sun gear 9 is connected with the turbine shaft 3 through the dog teeth 32 and 41 and the clutch sleeve 42 splined on the turbine shaft. The clutch sleeve 34 is shifted to the right-hand position to connect the propeller shaft 11 with the ring gear 12 and the anchorage sleeve 47 is shifted to the right-hand position to hold the cage 10 stationary. With this position of parts, the sun gear will be rotated by the turbine 4, the cage will be held against rotation by the anchorage sleeve 47, and the propeller shaft will be rotated reversely by means of the ring gear 12.

Fig. 8 shows at curve C the efficiency of the hydraulic converter when used without the planetary and at curve D the efficiency curve when combined with the above planetary construction. It also shows at curve E the torque when used without the planetary and at curve F the torque when combined with the planetary construction. From this is appears that without the planetary the efficiency drop is to sixty per cent. at .6 speed ratio, whereas when used with the planetary transmission the efficiency can be maintained at about eighty-five per cent. at .85 speed ratio.

It will be noted that in the forms in which the planet carrier 12 is connected or connectible to rotate with the turbine shaft 3, the one-way stator 5 is pried loose from its one-way anchor 7, not by any fluid pressure on the rear faces of the stator blades but by the action of the planet gear 13 on the sun gear 9 which acts on the stator shaft 6 to free the stator from its one-way anchor.

In the construction shown in Fig. 7 the parts 1, 2, 3, 4, 5, 10, 11, 12, and 13 may be substantially the same as those previously described. In this form, however, an additional one-way stator 48 is provided. In this form a one-way clutch 49 is provided to prevent the stator 5 from overrunning the shaft 3, a one-way clutch 50 is provided to prevent the one-way stator 48 from overrunning the sleeve 51 of the one-way clutch 49, and a one-way anchor 52 is provided to prevent reverse rotation of the shaft 53 of the one-way clutch 50. With this construction, in starting up the car, the rotors 5 and 48 both will act as stators to effect rotation of the turbine 4. This causes rotation of the ring gear 12, the sun gear 9 at first remaining stationary. At a later period in operation, the stator 5 will free itself from the one-way clutch 50 and will start rotating until it catches up with the shaft 3 whereupon it will act as a turbine through the one-way clutch 49. The stator 48 will continue to act as a stator until a later stage in the operation, whereupon it also will free itself from the one-way anchor 52 and the entire hydraulic device will thereafter act as a coupling, the sun gear 9 and ring gear 10 both being rotated.

In the construction shown in Fig. 9, the parts 1, 2, 3, 4, 5, 9, 10, 11, 12 and 13 are substantially the same as the corresponding parts previously described. In the construction of Fig. 9, a one-way clutch 54 is provided to prevent the stator from overrunning the turbine shaft 3, another one-way clutch 54a is provided to prevent the sun gear 9 from overrunning the stator 5 and a one-way anchorage 54b is provided to prevent reverse rotation of the stator 5. The planetary part of the transmission is driven from a tubular shaft splined on the turbine shaft 3 so as to be axially movable to three different positions. This combination clutch and tubular shaft 55 is axially shiftable by means of another clutch member 56 provided with a shifting ring 57 having a swivel connection with the tubular shaft 55. This shiftable member 56 also operates to shift a reverse clutch member 58 splined to a fixed part 59 of the casing and movable into and out of engagement with respect to clutch teeth 60 on the outer part of the cage 10. This shifting may be effected by means of a clutch shifting ring 61 swiveled on the clutch member 56 and connected with the reverse clutch 58 by means of rods 62 slidably mounted in openings in the fixed part 59 of the casing. A centrifugal clutch member 63 is provided which may be connected with the tubular drive shaft 55 in a certain position of this drive shaft and which is provided with a radially movable clutch member 64 forced outwardly by centrifugal force, when a certain speed is reached, into engagement with clutch openings in a clutch drum 65 secured to rotate with the inner part of the cage 10. A one-way roller clutch 66 is provided which in a certain position of the tubular drive shaft 55 acts to prevent overrunning of this tubular drive shaft with respect to the ring gear 12. A latch member 67 is provided which, in one position, holds the sun gear 9 against rotation to effect overdrive and, in another position, releases the sun gear.

In the forward position of the clutch shifting member (which is the position to the right of that shown in the drawing), the sun gear 9 is connected to rotate with the one-way clutch member 68, the reverse gear clutch 58 is inoperative, and the clutch on the axially movable tubular shaft 55 is in engagement with the cage 10 and out of engagement with the centrifugal clutch 63 and one-way clutch 66.

In this position of parts the turbine rotor 4 is connected direct with the cage 10 and the sun gear is connected so as to exert a forward force on the stator 5 tending to force it free from the one-way anchor 54b.

In the intermediate position of the axially shiftable tubular shaft, which is the position shown in the drawing, the sun gear 9 will still be connected with the one-way clutch member 68, the tubular shaft 55 will be freed from direct connection with the cage 10 but will be connected with the centrifugal clutch member 63 and also with the one-way clutch member 66. During low speeds the radially movable centrifugal clutch member 64 is in its inner position so that the cage 10 is not at that time connected with the tubular shaft 55 and the ring gear 12 is driven from the turbine rotor 4 through the turbine shaft 3, the tubular shaft 55, and the one-way clutch 66. At higher speeds the centrifugal clutch member 64 may be caused to connect with the cage 10 by momentarily slowing up the motor speed, whereupon the cage 10 will be connected with the turbine shaft 3 through the tubular splined shaft 55 and the centrifugal clutch 64. In this position of parts, the planetary gears 13 exert forward pressure on both ring gear 12 and sun gear 9 and hence the sun gear tends to pry the stator 5 free from its one-way anchor 54b.

For overdrive, the latch member 67 may be operated so as to hold the sun gear 9 against rotation whereupon an overdrive is effected from the turbine rotor 4 through the turbine shaft 3, tubular shaft 55, cage 10, planet gears 13 and ring gear 12.

For reverse, the clutch member 56 is shifted to its extreme left-hand position, in which the sun gear 9 is disconnected from the one-way clutch member 68 and connected direct to a clutch ring 69 on the turbine shaft, the sliding anchor member 58 is moved into engagement with the dog ring 60 on the cage to hold the cage against rotation, and the splined tubular shaft 55 is disconnected from all driving relations. With the parts in this position, the propeller shaft 11 will be rotated in a direction reverse to that of the turbine shaft, the sun gear 9 being driven from the turbine shaft 3, the cage 10 being held against rotation and the ring gear 12 being connected to the propeller shaft.

In the construction shown in Fig. 10, the parts 1, 2, 3, 4, 5, 9, 10, 11, 12 and 13 may be the same as in the forms previously described. A one-way anchor 70 is provided for preventing reverse rotation of the stator 5; a one-way clutch 71 is provided to prevent the stator 5 from overrunning the shaft 3; and a one-way clutch 72 is provided to prevent the sun gear 9 from overrunning the stator 5 when the clutch-sleeve 73 splined to the sun gear 9 is in the right-hand position connecting the sun gear 9 with the one-way clutch member. A latch member 75 is provided for holding the one-way clutch member 74 against rotation when desired, thus holding the sun gear 9 against rotation when the clutch member 73 is in the right-hand position, to effect overdrive. When the clutch member 73 is in intermediate position, the teeth 75a of the clutch sleeve 73 are disconnected from the clutch teeth 75b of the one-way clutch member 74 and connected with the clutch teeth 75c of turbine shaft 3. This movement of the clutch member to intermediate position also causes movement of a clutch sleeve and shaft member 76 to intermediate position through the action of the clutch shifting ring 77. When this shaft 76 is moved from the right-hand position to intermediate position, it disconnects the clutch teeth 77a of the sleeve 76 from the teeth 75c of the turbine shaft 3 and connects the cage 10 with the propeller shaft 11 through the clutch teeth 77b and 78, the teeth 77b being splined to the cage 10 and the teeth 78 engaging the clutch teeth 78a on the shaft 11. This shifting of the clutch sleeve 76 from right-hand to intermediate position also shifts a third clutch sleeve 79 splined to the ring gear 12 from a position in which it was connected with the propeller shaft 11 through the clutch teeth 80 and 81 to a position in which it is held against rotation by means of the clutch teeth 82 and 83. In this position of parts a comparatively low speed ratio is obtained, the ring gear 12 being held against rotation, the cage 10 being connected to the propeller shaft, and the sun gear 9 being driven from the turbine 4.

For reverse, the three clutch sleeves are shifted to their left-hand position, at which time the clutch member 84 splined on the fixed member 85 is shifted into engagement with the clutch teeth 86 on the cage 10 to hold the cage against rotation, the sun gear 9 being still connected with the turbine shaft 3 through the clutch teeth 75a and 75c and the ring gear 12 being connected to the propeller shaft 11 through the clutch teeth 80 and 87.

In the construction shown in Fig. 11, the parts 1, 2, 3, 4, 5, 9, 10, 11, 12, and 13 may be substantially the same as in the form previously described. A one-way anchor 88 is provided for preventing reverse rotation of the stator 5; a one-way clutch 89 is provided to prevent the stator 5 from overrunning the shaft 3, and a one-way clutch 90 is provided to prevent the sun gear 9 from overrunning the stator 5. The ring gear 12 is provided with an additional annular gear portion 91, of a different diameter from the annular gear portion 12, which meshes with a planet gear 92 mounted coaxially with the planet gear 13, this planet gear 92 meshing with a sun gear 93 mounted on a sleeve 94 surrounding the sleeve 95 of the sun gear 9. A latch construction 96 is provided by means of which the sun gear 93 may be held against rotation when desired to effect overdrive. With this construction different gear trains are provided—one including the sun gear 9 which determines the time of change-over in the hydraulic part of the transmission from torque converter to coupler and the other of which includes the sun gear 93 which determines the amount of overdrive.

Further modifications will be apparent to those skilled in the art and it is desired, therefore, that the invention be limited only by the prior art and the scope of the appended claims.

Having thus described my invention, what I claim and desire to secure by Letters Patent is:

1. A turbo-planetary transmission comprising a pump rotor, a turbine rotor, a shaft connected to rotate in unison with said turbine rotor, a gear carrier connected to rotate in unison with said shaft, planet gearing mounted on said gear carrier, a ring gear meshing with said planet gearing, a one-way rotatable turbostator, and a sun gear rotatable with said turbostator and meshing with said planet gearing.

2. A turbo-planetary transmission comprising a pump rotor, a turbine rotor, a shaft connected to rotate in unison with said turbine rotor, a gear carrier connected to rotate in unison with said shaft, planet gearing mounted on said gear carrier, a ring gear meshing with said planet gearing, a one-way rotatable turbostator, and a sun gear connected to rotate in unison with said turbostator and meshing with said planet gearing, said sun gear being connectible and disconnectible with respect to said turbostator.

3. A turbo-planetary transmission comprising a pump rotor, a turbine rotor, a shaft on which said turbine rotor is mounted, a gear carrier mounted on said shaft, planet gearing mounted on said gear carrier, a ring gear meshing with said planet gearing, a one-way rotatable turbostator, and a sun gear rotatable with said turbostator and meshing with said planet gearing, said sun gear having a one-way clutch connection with respect to said turbostator.

4. A turbo-planetary transmission comprising a pump rotor, a turbine rotor, a shaft on which said turbine rotor is mounted, a gear carrier mounted on said shaft, planet gearing mounted on said gear carrier, a ring gear meshing with said planet gearing, a one-way rotatable turbostator, a sun gear rotatable with said turbostator and meshing with said planet gearing, said sun gear having a one-way clutch connection with respect to said turbostator, and means for holding said sun gear against rotation for overdrive.

5. A turbo-planetary transmission comprising a pump rotor, a turbine rotor, a shaft on which said turbine rotor is mounted, a gear carrier connectible and disconnectible with respect to said shaft, planet gearing mounted on said gear carrier, a ring gear meshing with said planet gearing, a one-way rotatable turbostator, a sun gear connected to rotate in unison with said turbostator and meshing with said planet gearing, said sun gear being connectible and disconnectible with respect to said turbostator, means for connecting said sun gear to rotate with said turbine rotor, and means for holding said gear carrier against rotation to effect reverse rotation of said ring gear.

6. A turbo-planetary transmission comprising a pump rotor, a turbine rotor, a shaft on which said turbine rotor is mounted, a gear carrier connectible and disconnectible with respect to said shaft, planet gearing mounted on said gear carrier, a ring gear meshing with said planet gearing, a one-way rotatable turbostator, a sun gear rotatable with said turbostator and meshing with said planet gearing, said sun gear having a one-way clutch connection with respect to said turbostator, means for holding said sun gear against rotation for overdrive, means for connecting said sun gear to rotate with said turbine rotor, and means for holding said gear carrier against rotation to effect reverse rotation of said ring gear.

7. A turbo-planetary transmission comprising a pump rotor, a turbine rotor, a shaft on which said turbine rotor is mounted, a gear carrier rotatable in unison with said shaft, planet gearing mounted on said gear carrier, a ring gear meshing with said planet gears, a one-way rotatable turbostator, a sun gear, releasable anchorage means for holding said turbostator and sun gear against rotation reverse to that of the turbine rotor, and for releasing said sun gear and turbostator simultaneously for rotation in the same direction as the turbine rotor.

8. A turbo-planetary transmission comprising a pump rotor, a turbine rotor, a shaft on which said turbine rotor is mounted, a gear carrier driven in unison with said shaft, planet gearing mounted on said gear carrier, a ring gear meshing with said planet gear, a one-way rotatable turbostator, a sun gear meshing with said planet gearing, a one-way clutch construction for preventing said sun gear from overrunning said shaft, and means for holding said sun gear against rotation to effect overdrive of said ring gear.

9. A turbo-planetary transmission including a hydraulic torque converter and a planetary transmission in series power flow relation, said torque converter comprising a pump rotor, a turbine rotor, a one-way rotatable turbostator, and one-way anchorage means preventing reverse rotation of said turbostator and enabling forward rotation thereof, said planetary transmission comprising a sun gear, a ring gear, a gear carrier, a planet gear mounted on said gear carrier and meshing with said sun gear and ring gear, and one-way clutch means connecting said sun gear and turbostator whereby force exerted on said sun gear by said planet gear tends to cause rotation of said turbostator and whereby said turbostator may rotate while the sun gear is held against rotation, and means whereby said sun gear may be held against rotation to effect overdrive of said ring gear.

10. A turbo-planetary transmission comprising a pump rotor, a turbine rotor, a one-way turbostator, one-way anchorage means for holding said turbostator against reverse rotation, a sun gear, a ring gear, a gear carrier, planet gearing carried by said gear carrier and meshing with said sun gear and ring gear, said sun gear being connected to rotate in unison with said turbostator, a drive shaft for driving said pump rotor, and a driven shaft driven by said turbine rotor, said gear carrier being connected to one of said shafts to rotate in unison therewith, whereby force exerted on said sun gear by said planet gearing tends to cause rotation of said one-way rotatable turbostator.

WILLARD L. POLLARD.